(12) United States Patent
Sakai

(10) Patent No.: US 8,217,600 B2
(45) Date of Patent: Jul. 10, 2012

(54) MOTOR CONTROL DEVICE AND ELECTRIC POWER STEERING SYSTEM

(75) Inventor: Atsuo Sakai, Okazaki (JP)

(73) Assignee: JTEKT Corporation, Osaka (JP)

( * ) Notice: Subject to any disclaimer, the term of this patent is extended or adjusted under 35 U.S.C. 154(b) by 172 days.

(21) Appl. No.: 12/876,404

(22) Filed: Sep. 7, 2010

(65) Prior Publication Data

US 2011/0062905 A1  Mar. 17, 2011

(30) Foreign Application Priority Data

Sep. 14, 2009 (JP) .................................. 2009-211767

(51) Int. Cl.
*H02P 6/06* (2006.01)
(52) U.S. Cl. ........... 318/400.05; 318/400.1; 318/400.22; 318/437
(58) Field of Classification Search ............. 318/400.05, 318/400.1, 400.22, 400.39, 437, 494, 495, 318/712, 714, 716, 720, 724
See application file for complete search history.

(56) References Cited

U.S. PATENT DOCUMENTS

| | | | | |
|---|---|---|---|---|
| 4,492,902 A | * | 1/1985 | Ficken et al. | 318/400.04 |
| 4,529,922 A | * | 7/1985 | Ono | 318/603 |
| 4,608,524 A | * | 8/1986 | Yokobori | 318/400.04 |
| 4,682,090 A | * | 7/1987 | Schmidt et al. | 318/661 |
| 5,075,612 A | * | 12/1991 | Margaris | 318/807 |
| 5,304,909 A | | 4/1994 | Jin et al. | |
| 6,272,410 B2 | * | 8/2001 | Okanoue et al. | 701/42 |

FOREIGN PATENT DOCUMENTS

| | | |
|---|---|---|
| JP | A-05-052587 | 3/1993 |
| JP | A-11-160099 | 6/1999 |
| JP | A-2007-295753 | 11/2007 |
| JP | A-2009-001055 | 1/2009 |

* cited by examiner

*Primary Examiner* — Bentsu Ro
*Assistant Examiner* — Thai Dinh
(74) *Attorney, Agent, or Firm* — Oliff & Berridge, PLC

(57) ABSTRACT

A motor control device is configured in such a manner that a current detection circuit and an exciting circuit for a motor resolver share one grounding wire. A microcomputer that serves as a current detector sets a phase of an exciting current in such a manner that values of an excitation noise superimposed on an output voltage of the current detection circuit at respective timings (L1, H1, L2, H2, . . . ), at which the output voltage is acquired in one current detection process, are equal to each other. An electric power steering system is provided with the motor control device.

8 Claims, 5 Drawing Sheets

MOTOR CONTROL DEVICE AND ELECTRIC POWER STEERING SYSTEM

INCORPORATION BY REFERENCE

The disclosure of Japanese Patent Application No. 2009-211767 filed on Sep. 14, 2009 including the specification, drawings and abstract, is incorporated herein by reference in its entirety.

BACKGROUND OF THE INVENTION

1. Field of the Invention

The invention relates to a motor control device and an electric power steering system.

2. Description of the Related Art

Some of motor control devices used for an electric power steering system (EPS), or the like, output three-phase driving currents based on current values of the respective phases and a rotation angle (motor rotation angle) to a motor by executing current control using a triangular wave as a PWM carrier.

In such a motor control device, a resistor (shunt resistor) for detecting a current is provided in a power line corresponding to each phase. The current value of each phase is detected on the basis of a voltage between the terminals of each of these shunt resistors.

For example, as described in Japanese Patent Application Publication No. 2009-1055 (JP-A-2009-1055), in most cases, each shunt resistor is connected in series with a ground side of corresponding switching element pair (switching arm) that constitutes the driving circuit (PWM inverter). Then, each voltage between the terminals is amplified by a current detection circuit and is then input in an electronic circuit (microcomputer) that constitutes a current detector. Note that the configuration of the current detection circuit that amplifies and outputs the voltage between the terminals of the shunt resistor in this way is for example, described in Japanese Patent Application Publication No. 2007-295753 (JP-A-2007-295753). Then, the current value of each phase is detected on the basis of a difference between an output voltage (peak voltage) of the current detection circuit acquired (sampled) at a timing at which a PWM carrier that is a base of current control executed to drive the motor, that is, a triangular wave, reaches a "peak" and an output voltage (valley voltage) of the current detection circuit sampled at a timing at which the triangular wave reaches a "valley" immediately before the triangular wave reaches the "peak".

That is, normally, at a timing at which the triangular wave reaches a "valley", all the switching elements at the ground side (downstream side) that constitute the PWM inverter are turned off. That is, theoretically, each output voltage acquired at this timing is a ground voltage. In addition, all the switching elements at the ground side are turned on at a timing at which the triangular wave reaches a "peak". Thus, by using a difference between these peak voltage and valley voltage, it is possible to accurately detect the current values of the respective phases by suppressing the influence of the switching noise.

In addition, some motors (brushless motors) that operate on the basis of the above-described three-phase driving currents include a resolver (motor resolver) as a rotation angle sensor. Then, when such a motor is set as a control target, the rotation angle is detected on the basis of two-phase output signals (a sinusoidal signal and a cosine signal) obtained by outputting exciting current to the motor resolver.

Note that the configuration of such a motor resolver and the details of a method of detecting a rotation angle on the basis of an output signal of the motor resolver are, for example, described in Japanese Patent Application Publication No. 11-160099 (JP-A-11-160099). Then, the configuration of an exciting circuit that outputs exciting current to a motor resolver is, for example, described in Japanese Patent Application Publication No. 5-52587 (JP-A-5-52587).

Incidentally, in recent years, with the improvement of manufacturing technique, a circuit through which a relatively large current flows may also be packaged. An increased number of the above-described motor control devices are also formed in such a manner that a current detection circuit used to detect the current of each phase and an exciting circuit for a motor resolver are formed in one package.

However, by forming the current detection circuit and the exciting circuit in one package in this way, these current detection circuit and exciting circuit share the grounding wire. This causes fluctuations in reference voltage (potential) in the amplified output of the voltage between the resistor terminals, amplified by the current detection circuit. Then, the fluctuations in reference voltage are incorporated into (superimposed onto) the output voltage of the current detection circuit as an excitation noise, resulting in a possible decrease in current detection accuracy.

The amplified output of the voltage between the resistor terminals, amplified by the current detection circuit, and detection of the current value of each phase based on the output voltage both are theoretically performed with reference to the ground voltage. However, actually, the grounding wire that grounds the current detection circuit also has a resistance (impedance). In addition, normally, a current output circuit, such as an exciting circuit and a driving circuit, is arranged at a location remote from a microcomputer that constitutes a current detector. Thus, the actual reference voltage of the current detection circuit is a voltage at a connecting point at which the current detection circuit and the exciting circuit that share the grounding wire are connected. Then, the voltage at the connecting point fluctuates on the basis of the impedance of the grounding wire with an exciting current output from the exciting circuit.

That is, as in the case of the microcomputer that constitutes the current detector, when the ground voltage is set as a reference, an excitation noise corresponding to fluctuations in the connecting point voltage used by the current detection circuit as a reference is superimposed on the output voltage of the current detection circuit. Therefore, as shown in FIG. 6, when the output voltages of the current detection circuit, acquired at sampling timings (L1, H1, L2, H2, . . . ) in one current detection process, are compared, the value of each peak voltage is offset by a variation ($\Delta V$) of the excitation noise from the value of a corresponding one of the valley voltages, resulting in a possible decrease in current detection accuracy.

SUMMARY OF INVENTION

It is an object of the invention to provide a motor control device and an electric power steering system that are able to detect current with high accuracy when a current detection circuit and an exciting circuit for a motor resolver share a grounding wire.

An aspect of the invention relates to a motor control device. The motor control device includes: a current detection circuit that amplifies a voltage between terminals of a current detection resistor provided so as to correspond to each phase of a motor, and that outputs the amplified voltage; a current detector that detects a current value of each phase of the motor on the basis of an output voltage of the current detection circuit using a ground voltage as a reference; an exciting circuit that outputs an exciting current to a motor resolver provided to detect a rotation angle of the motor; and a motor driver that executes current control using a triangular wave as a PWM carrier on the basis of the current value of each phase and the rotation angle. The current detector detects the current value of each phase on the basis of a difference between an output voltage of the current detection circuit, acquired at a timing at which the triangular wave reaches a peak, and an output voltage of the current detection circuit, acquired at a timing at which the triangular wave reaches a valley immediately before the triangular wave reaches the peak. The current detection circuit and the exciting circuit share a grounding wire. The motor control device sets a phase of the exciting current in such a manner that output levels of the exciting current at respective timings, at which the current detector acquires an output voltage of the current detection circuit in one current detection circuit, are equal to each other.

In the above-described aspect, the current detection circuit and the exciting circuit may be formed in one package that is separate from an electronic circuit that constitutes the current detector. With the above-described configuration, an excitation noise is cancelled by computing a difference between the peak voltage and the valley voltage. As a result, even when the current detection circuit and the exciting circuit for the motor resolver share the grounding wire, it is possible to further accurately detect current.

In the configuration where the current detection circuit and the exciting circuit are incorporated in one package, the length of the grounding wire shared by the current detection circuit and the exciting circuit is extremely larger than the wire length from the components of the current detection circuit to the connecting point at which the current detection circuit is connected to the exciting circuit. Therefore, an excitation noise arising from the output of the exciting current also increases. However, according to the above-described aspect, irrespective of the magnitude of an excitation noise, the excitation noise may be cancelled by computing the difference.

The motor control device according to the above-described aspect may be mounted on an electric power steering system. According to the above configuration, it is possible to provide an electric power steering system that has excellent quietness and steering feeling by ensuring accurate current detection in control over the motor that serves as the driving source of the electric power steering system.

BRIEF DESCRIPTION OF DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
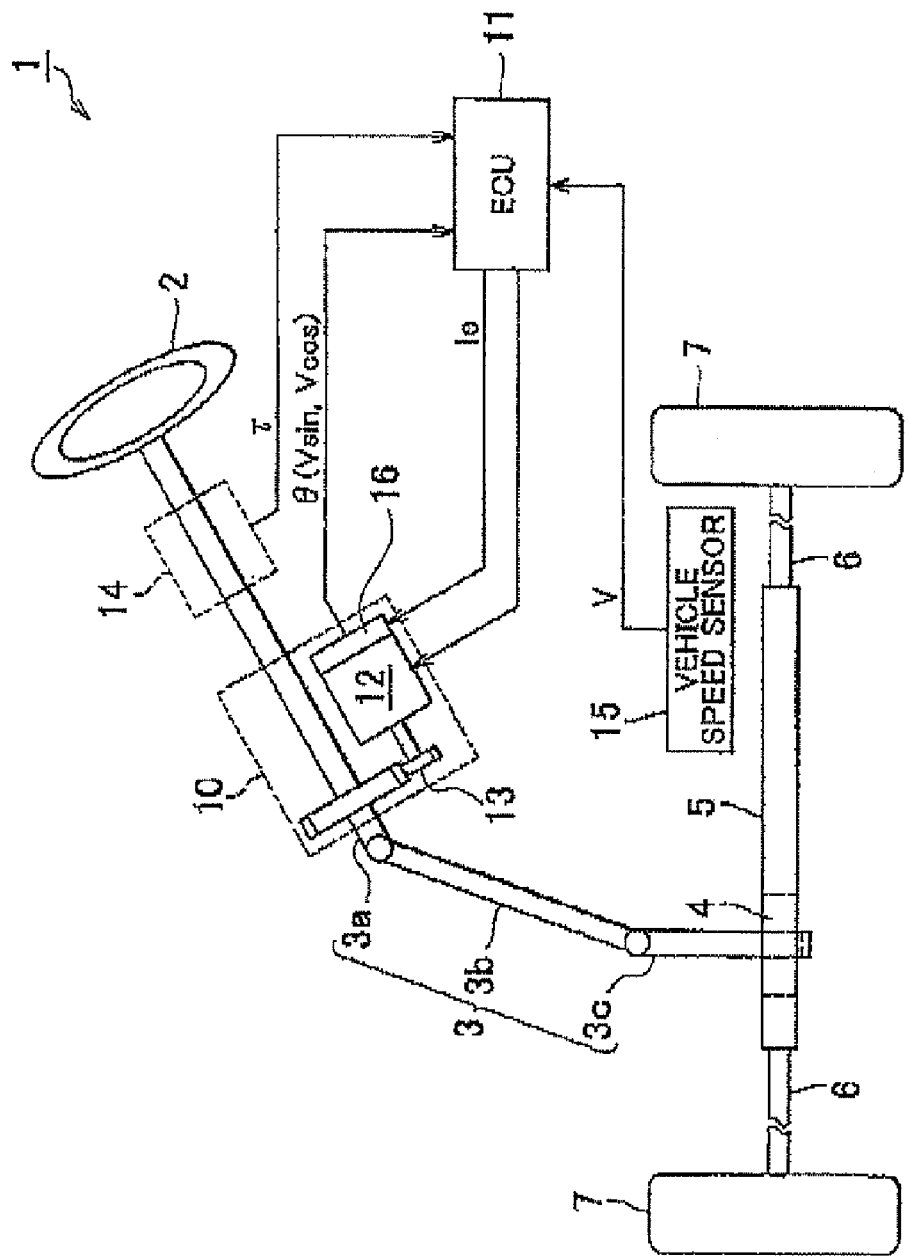
FIG. 1 is a schematic configuration diagram of an electric power steering system (EPS)

Hereinafter, an embodiment of the invention will be described with reference to the accompanying drawings. As shown in FIG. 1, an electric power steering system (EPS) 1 according to the present embodiment includes a steering shaft 3 to which a steering wheel 2 is fixed. The steering shaft 3 is coupled to a rack shaft 5 via a rack-and-pinion mechanism 4. Rotation of the steering shaft 3 resulting from steering operation is converted into linear reciprocating motion of the rack shaft 5 by the rack-and-pinion mechanism 4. The steering shaft 3 is formed by coupling a column shaft 3a, an intermediate shaft 3b and a pinion shaft 3c together. Then, the linear reciprocating motion of the rack shaft 5 resulting from the rotation of the steering shaft 3 is transmitted to knuckles (not shown) via tie rods 6 coupled to respective ends of the rack shaft 5. This changes the steered angles of steered wheels 7, that is, the traveling direction of a vehicle.

In addition, the EPS 1 includes an EPS actuator 10 and an ECU 11. The EPS actuator 10 serves as a steering force assisting device and applies assist force for assisting steering operation to a steering system. The ECU 11 serves as a controller and controls the EPS actuator 10.

The EPS actuator 10 is a column assist-type EPS actuator in which a motor 12 that serves as a driving source is drivably coupled to the column shaft 3a via a reduction mechanism 13. Note that, in the present embodiment, a known worm wheel is employed as the reduction mechanism 13. A brushless motor is employed as the motor 12. The motor 12 rotates by three-phase (U, V, W) driving currents supplied from the ECU 11. Then, the EPS actuator 10 reduces the rotation of the motor 12 and then transmits the rotation to the column shaft 3a to thereby apply the motor torque to the steering system as assist force.

A torque sensor 14 and a vehicle speed sensor 15 are connected to the ECU 11. Note that the torque sensor 14 according to the present embodiment is provided on the column shaft 3a and is located closer to the steering wheel 2 than the reduction mechanism 13 that constitutes the EPS actuator 10. Then, the ECU 11 controls the operation of the EPS actuator 10, more specifically, motor torque generated by the motor 12 that serves as a driving source, on the basis of a steering torque τ detected by the torque sensor 14 and a vehicle speed V detected by the vehicle speed sensor 15 to thereby execute the power assist control.

The motor 12 includes a motor resolver 16 for detecting the rotation angle (electrical angle) θ. The motor resolver 16 outputs two-phase signals having different phases (a sinusoidal signal and a cosine signal) on the basis of an exciting current Ie output from the ECU 11. That is, the motor resolver 16 is configured as a one-phase excitation and two-phase outputs resolver. Then, the ECU 11 that serves as a motor driver supplies a driving current to the motor 12 on the basis of the rotation angle θ of the motor 12 detected on the basis of two-phase output signals V sin and V cos output from the motor resolver 16 and the current values (Iu, Iv, Iw) of the respective phases.

Figure 2:
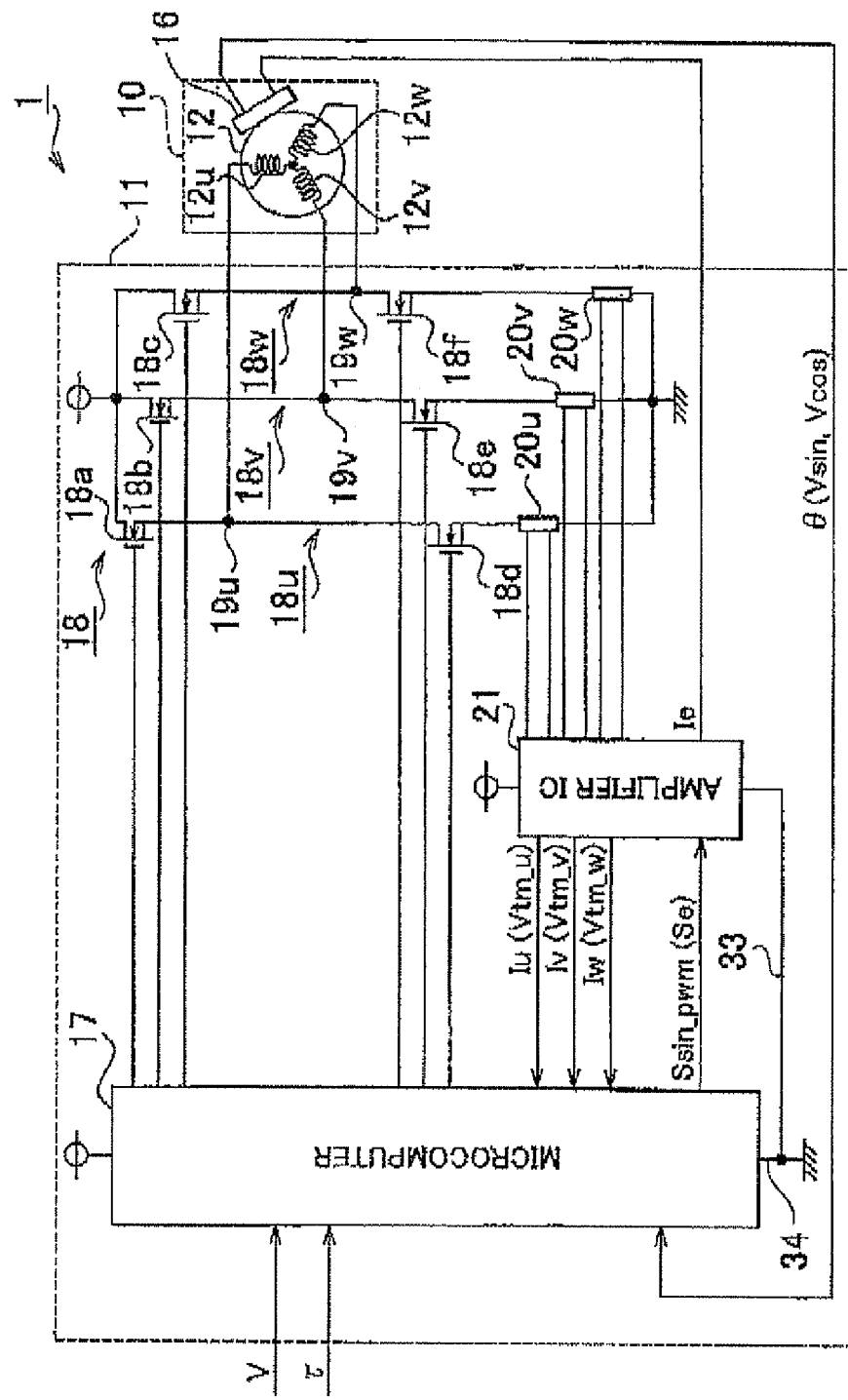
FIG. 2 is a block diagram that shows the electrical configuration of the EPS.

Next, the electrical configuration of the EPS according to the present embodiment will be described. FIG. 2 is a control block diagram of the EPS according to the present embodiment. As shown in the drawing, the ECU 11 includes a microcomputer 17 and a driving circuit 18. The microcomputer 17 outputs motor control signals. The driving circuit 18 supplies three-phase driving currents on the basis of the motor control signals output from the microcomputer 17.

The driving circuit 18 is formed by connecting a plurality of FETs 18a to 18f that serve as switching elements. Specifically, the driving circuit 18 is formed by connecting series circuits of the sets of FETs 18a and 18d, FETs 18b and 18e and FETs 18O and 18I in parallel with one another, and connecting points 19u, 19v and 19w of the FETs 18a and 18d, FETs 18b and 18e and FETs 18c and 18f are respectively connected to motor coils 12u, 12v and 12w of the respective phases of the motor 12.

The driving circuit 18 is configured as a known PWM inverter that is forged by connecting three switching arms 18u, 18v and 18w corresponding to the respective phases in parallel with one another, using a pair of serially connected switching elements as a base unit (switching arm). The motor control signals output from the microcomputer 17 are gate on/off signals that determine the switching statuses of the FETs 18a to 18f that constitute the driving circuit 18.

Each of the FETS 18a to 18f is turned on or off in response to the motor control signal applied to its gate terminal to change the pattern of energizing the motor coils 12u, 12v and 12w of the respective phases. Thus, the applied power supply voltage is converted into three-phase (U, V, W) driving currents, and the driving currents are output to the motor 12.

Shunt resistors 20; 20v and 20w are serially connected to the low potential sides (ground sides, lower sides in FIG. 2) of the switching arms 18; 18v and 18w that constitute the driving circuit 18. The shunt resistors 20u, 20v and 20w serve as current detection resistors. The microcomputer 17 uses the current values Iu, Iv and Iw of the respective phases of the motor 12, detected on the basis of the voltages Vtm_u, Vtm_v and Vtm_w between the terminals of these shunt resistors 20u, 20v and 20w and the rotation angle θ of the motor 12, detected on the basis of the output signals V sin and V cos of the motor resolver 16, to output motor control signals to the driving circuit 18.

More specifically, the microcomputer 17 receives a steering torque τ detected by the torque sensor 14 and a vehicle speed V detected by the vehicle speed sensor 15, and the microcomputer 17 determines an assist force (target assist force) to be applied to the steering system on the basis of these steering torque τ and vehicle speed V. The microcomputer 17 computes a larger target assist force as the detected steering torque τ increases or as the vehicle speed V decreases. Then, in order to generate a motor torque corresponding to the target assist force, the microcomputer 17 executes current control based on the detected current values Iu, Iv and Iw of the respective phases and the detected rotation angle θ to thereby generate the motor control signals.

More specifically, the microcomputer 17 executes current feedback control so as to cause current command values corresponding to the target assist force to follow actual current values of the motor 12. Note that, in the present embodiment, the current feedback control is performed in a d/q coordinate system by subjecting the detected current values Iu, Iv and Iw of the respective phases to coordinate transformation (three phase to two phase transformation) in accordance with the rotation angle θ of the motor 12. That is, because a motor torque generated by the brushless motor may be controlled by a q-axis current, the current command values corresponding to the target assist force are computed as a q-axis current command value. The resultant voltage command values in the d/q coordinate system are subjected to inverse transformation (two phase to three phase transformation) to thereby obtain voltage command values of the respective phases in the three-phase coordinate system (U, V, W).

Furthermore, the microcomputer 17 generates motor control signals that determine the switching statuses (on/off operations) of the FETs 18a to 18f that constitute the driving circuit 18 on the basis of a comparison between DUTY command values corresponding to the voltage command values of the respective phases computed as described above and a triangular wave that is a PWM carrier (carrier wave).

Figure 3:
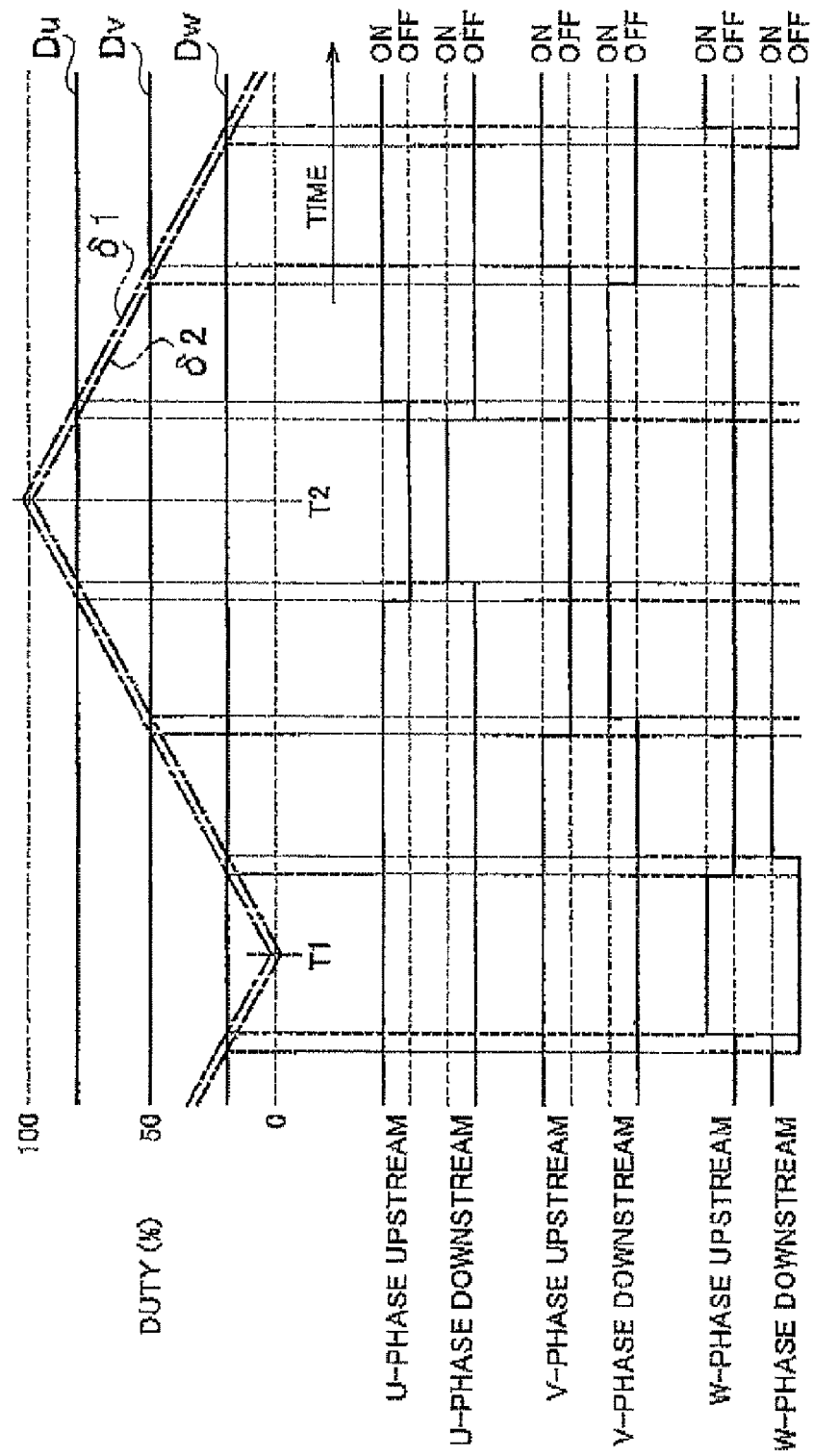
FIG. 3 is a view that illustrates the manner of current control in which a triangular wave is used as a PWM carrier.

Specifically, as shown in FIG. 3, in each of the switching arms 18u, 18v and 18w that constitute the driving circuit 18, in order to set a dead time for preventing a short circuit (arm short circuit) between the high-potential side (upstream) FET and the low-potential side (downstream) FET, two triangular waves δ1 and δ2 (δ1>δ2) that are offset from each other in the up-down direction in FIG. 3 are used.

When the DUTY command value Du, Dv or Dw is higher than the value of the triangular wave δ1, the microcomputer 17 generates a motor control signal that turns on the high-potential side FET 18a, 18b or 18c corresponding to that phase, whereas, when the DUTY command value Du, Dv or Dw is lower than the value of the triangular wave δ1, the microcomputer 17 generates a motor control signal that turns of the FETs 18a, 18b or 18c corresponding to that phase. Similarly, when the DUTY command value Du, Dv or Dw is lower than the value of the triangular wave δ2, the microcomputer 17 generates a motor control signal that turns on the low-potential side (downstream) FET 18d, 18e or 18f corresponding to that phase; whereas, when the DUTY command value Du, Dv or Dw is higher than the value of the triangular wave δ2, the microcomputer 17 generates a motor control signal that turns off the FET 18d, 18e or 18f corresponding to that phase. Then, the driving circuit 18 operates on the basis of the motor control signals. As a result, actual currents corresponding to the current command values are applied to the motor 12.

In this way, the ECU 11 that serves as a motor driver executes current control that uses a triangular wave as a PWM carrier on the basis of the detected current values Iu, Iv and Iw of the respective phases and the detected rotation angle θ of the motor 12. Thus, the ECU 11 is able to control the operation of the motor 12 in order to generate a motor torque corresponding to the target assist force.

Next, the manner of detecting current and outputting exciting current according to the present embodiment will be described. As shown in FIG. 2, the ECU 11 includes an amplifier IC 21. The voltages Vtm_u, Vtm_v and Vtm_w between the terminals of the respective shunt resistors 20u, 20v and 20w that are provided as the current detection resistors as described above are amplified by a current detection circuit 22 formed in the amplifier IC 21. The microcomputer 17 is configured to detect the current values Iu, Iv and Iw of the respective phases of the motor 12 on the basis of the output voltages of the current detection circuit.

Figure 4:
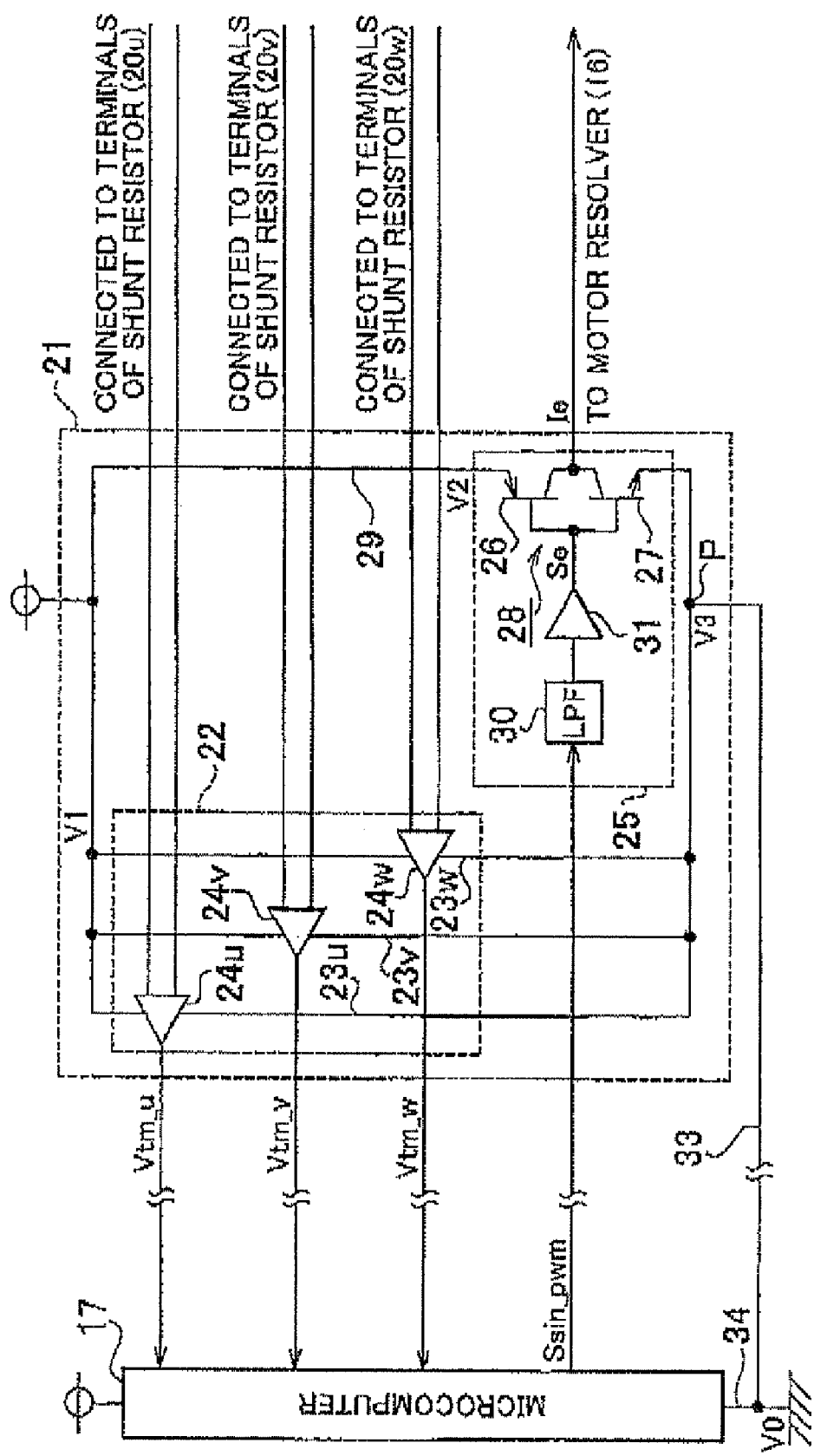
FIG. 4 is a schematic configuration diagram of a current detection circuit and an exciting circuit that are formed in one package.

More specifically, as shown in FIG. 4, the current detection circuit 22 is formed when each of the input terminals of operational amplifiers 24u, 24v and 24w, to which parallel-connected power feed lines 23u, 23v and 23w are connected, is connected to the power supply side and ground side terminals of a corresponding one of the shunt resistors 20u, 20v and 20w in correspondence with each phase of the motor 12. Then, the microcomputer 17 that serves as a current detector acquires the voltages Vtm_u, Vtm_v and Vtm_w between the terminals of the respective shunt resistors 20u, 20v and 20w, amplified by the operational amplifiers 24u, 24v and 24w on the basis of an operating voltage V1 and output from the operational amplifiers 24u, 24v and 24w, at a predetermined timing to thereby detect the current values Iu, Iv and Iw of the respective phases.

As shown in FIG. 3, the microcomputer 17 acquires the output voltages of the current detection circuit 22 at a timing at which the triangular waves (δ1 and δ2) that serve as a PWM carrier that is a base of the current control reach a "valley" (in the graph, time T1) and a timing at which the triangular waves reach a "peak" (in the graph, time T2). Note that, in this case, the "timing at which the triangular waves reach a peak" and the "timing at which the triangular waves reach a valley" respectively indicate a timing at which the values of the triangular waves reach a maximum and a timing at which the values of the triangular waves reach a minimum. Then, the microcomputer 17 is configured to detect the current values Iu, Iv and Iw of the respective phases on the basis of a difference between the output voltages (peak voltages) of the current detection circuit, acquired at a timing at which the triangular waves reach a "peak" and the output voltages (valley voltages) of the current detection circuit, acquired at a tuning at which the triangular waves reach a "valley" immediately before the triangular wave readies the "peak".

In addition, as shown in FIG. 4, in the ECU 11, an exciting circuit 25 that outputs the exciting current Ie to the motor resolver 16 is formed in the amplifier IC 21 together with the current detection circuit 22.

More specifically, the exciting circuit 25 includes a push-pull circuit 28 that is formed when two transistors 26 and 27 are connected to each other so as to be symmetrical in polarity. Note that the push-pull circuit 28 is formed by connecting the collector terminals of a PNP transistor and an NPN transistor to each other. The exciting circuit 25 inputs a sinusoidal excitation signal Se to the base terminals of the transistors 26 and 27 that constitute the push-pull circuit 28, and amplifies the excitation signal Se on the basis of an operation voltage V2 applied through the power feed line 29 to thereby generate the exciting current Ie to be output to the motor resolver 16.

The microcomputer 17 has a function of outputting a rectangular SIN wave PWM signal S sin_pwm. Then, the exciting circuit 25 is provided with a low-pass filter 30 in which the SIN wave PWM signal S sin_pwm is input.

In the exciting circuit 25, the wave PWM signal S sin_pwm output from the microcomputer 17 passes through the low-pass filter 30 to thereby generate the above-described sinusoidal excitation signal Se. Then, when the excitation signal Se is input to the push-pull circuit 28 through a buffer 31, the exciting current Ie is output to the motor resolver 16.

In the amplifier IC 21, the power feed lines 23u, 23v and 23w of the current detection circuit 22 and the power feed line 29 of the exciting circuit 25 are connected in parallel with one another. In addition, in the ECU 11, the amplifier IC 21 in which the current detection circuit 22 and the exciting circuit 25 are formed in one package is arranged away from the microcomputer 17 as described above. Them the amplifier IC 21 is grounded in such a manner that one end of the grounding wire 33 is connected to the grounding wire 34 of the microcomputer 17.

However, when the current detection circuit 22 and the exciting circuit 25 share one grounding wire 33 as described above, there occurs a problem that an excitation noise arising from the exciting current Ie output from the exciting circuit 25 is superimposed on the output voltages of the current detection circuit 22.

That is, the amplified outputs of the voltages Vtm_u, Vtm_v and Vtm_w between the terminals of the respective shunt resistors 20u, 20v and 20w, amplified by the current detection circuit 22, theoretically use a ground voltage V0 as a reference in the case of the microcomputer 17 that constitutes the current detector. However, actually, the grounding wire 33 also has a resistance (impedance). Thus, as described above, in the configuration where the current detection circuit 22 and the exciting circuit 25 share the grounding wire 33, actually, the voltage that is used by the current detection circuit 22 as a reference is a voltage at the connecting point P between the current detection circuit 22 and the exciting circuit 25. Then, an actual reference voltage V3 fluctuates in accordance with the exciting current Ie output from the exciting circuit 25. As a result, the voltage fluctuations are superimposed on the output voltage of the exciting circuit 25 as an excitation noise.

Figure 5:
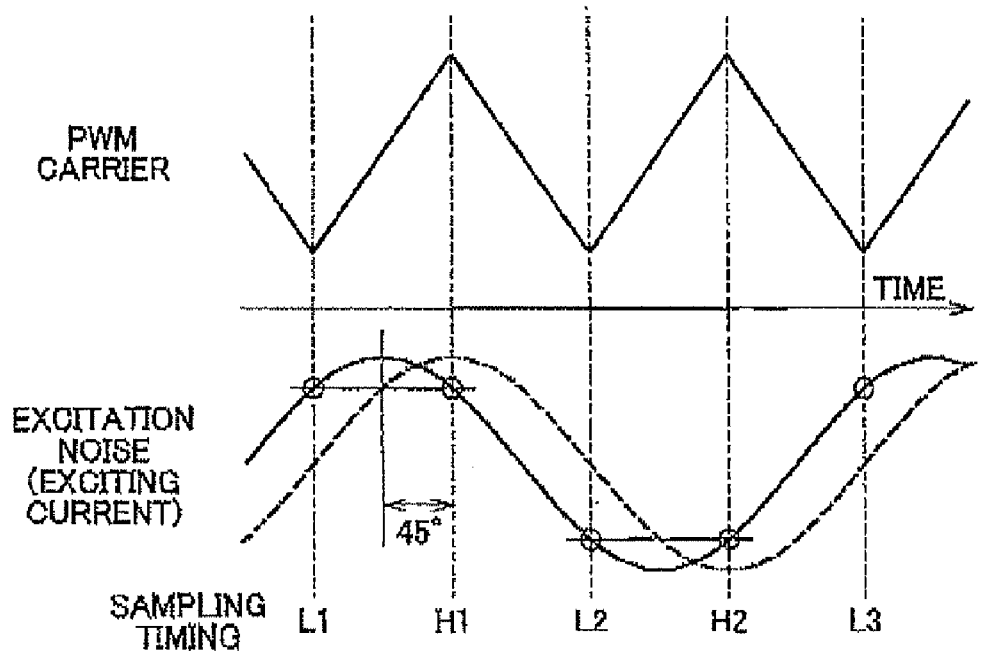
FIG. 5 is a view that illustrates a current detection timing and the relationship between a phase of an exciting current and an excitation noise superimposed on an output voltage of the current detection circuit.

In order to take measures against this problem, in the ECU 11, as shown in FIG. 5, the phase of the exciting current Ie is set in such a manner that the output level of the excites current Ie at a timing (H1, H2, . . . ) at which the triangular wave that is the PWM carrier reaches a "peak" is equal to the output level of the exciting current Ie at a timing (L1, L2, . . . ) at which the triangular wave reaches a "valley" immediately before the triangular wave reaches the "peak".

Specifically, in the present embodiment, one period of the exciting current Ie is twice as long as one period of the triangular wave that is the PWM carrier. Thus, the phase at which the triangular wave reaches a valley when the exciting current Ie having a sinusoidal waveform is "0°" is used as a reference phase (in the graph, the waveform indicated by the broken line). Then, the microcomputer 17 outputs the SIN wave PWM signal S sin_pwm so that the phase of the exciting current Ie is advanced from the reference phase by "45°" to thereby equalize the values of an excitation noise superimposed on the output voltage at respective timings (L1, H2, L2, H2, at which the output voltages of the current detection circuit 22 are acquired in one current detection process.

According to the above configuration, the ECU 11 according to the present embodiment is able to produce the following advantageous effects.

Figure 6:
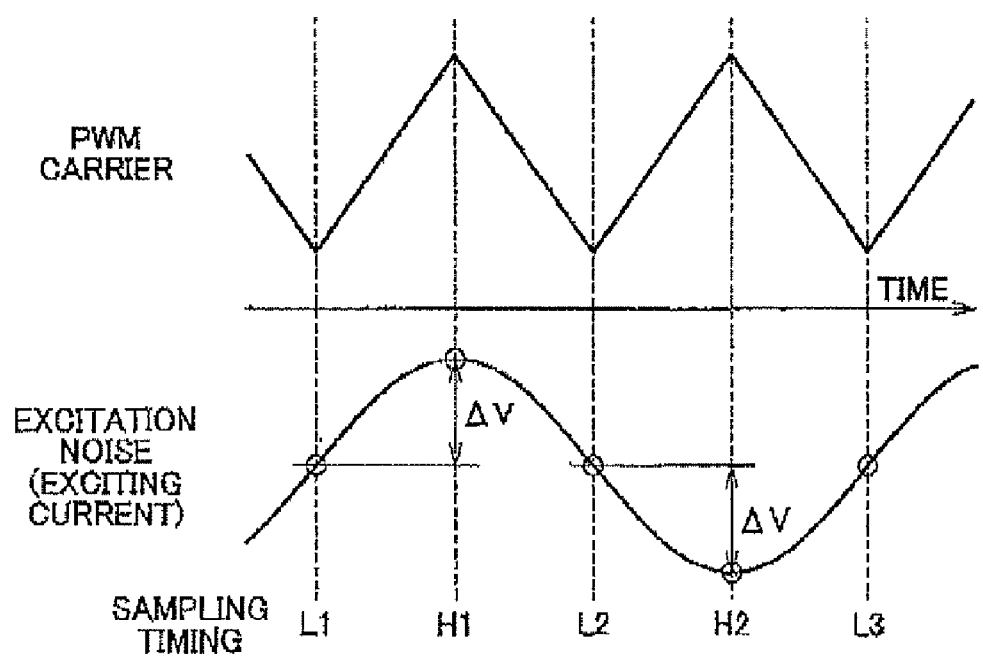
FIG. 6 is a view that illustrates the influence of an excitation noise superimposed on the output voltage of the current detection circuit.

1) The exciting current Ie to be output to the motor resolver 16 is synchronized with the triangular wave that is the PWM carrier. Therefore, when an excitation noise is superimposed on the output voltages of the current detection circuit 22 as described above, the value of each peak voltage is offset by a variation (ΔV) of the excitation noise from the value of a corresponding one of the valley voltages, resulting in a decrease in current detection accuracy (see FIG. 6).

However, as described above, if the values of an excitation noise superimposed on the output voltages of the current detection circuit 22 at respective timings (L1, H1, L2, H2, . . . ), at which the microcomputer 17 that serves as the current detector acquires the output voltages of the current detection circuit 22 in one current detection process, are equal to each other, the excitation noise is cancelled by computing a difference between the peak voltage and the valley voltage. As a result, even when the current detection circuit 22 and the exciting circuit 25 for the motor resolver 16 share the grounding wire 33, it is possible to further accurately detect current.

2) Particularly, in the configuration where the current detection circuit 22 and the exciting circuit 25 are incorporated in one package like the amplifier IC 21, the length of the grounding wire 33 shared by the current detection circuit 22 and the exciting circuit 25 is extremely larger than the wire length from each of the operational amplifiers 24n, 24v and 24w that constitute the current detection circuit 22 to the connecting point P at which the current detection circuit 22 is connected to the exciting circuit 25. Therefore, an excitation noise arising from the output exciting current Ie also increases. However, according to the configuration, irrespective of the magnitude of an excitation noise, the influence may be cancelled by computing the difference. Thus, by applying the present embodiment to the thus packaged configuration, it is possible to produce further remarkable advantageous effect.

Note that the above-described embodiment may be modified into the following alternative embodiments.

In the above-described embodiment, the aspect of the invention is embodied as the ECU 11 that serves as the motor control device for controlling the operation of the motor 12 that serves as the driving source of the EPS actuator 10. However, the aspect of the invention is not limited to the above-described embodiment, and the aspect of the invention may be applied to devices other than the EPS.

In addition, the type of EPS is not limited to a column assist-type; it may be of a pinion assist-type or a rack assist-type.

In the above-described embodiment, the current detection circuit 22 and the exciting circuit 25 are formed in the amplifier IC 21 to be incorporated in one package. However, the aspect of the invention is not limited to this configuration. As long as the grounding wire is shared by a current detection circuit and an exciting circuit, the current detection circuit 22 and the exciting circuit 25 need not be formed in one package. Note that, in this case as well, as the length of the grounding wire is larger, by a greater amount, than the wire length from the components of the current detection circuit to the connecting point at which the current detection circuit is connected to the exciting circuit, further remarkable advantageous effects may be produced.

In the above-described embodiment, the push-pull circuit 28 that constitutes the exciting circuit 25 is formed by connecting the collector terminals of the PNP transistor and NPN transistor to each other. However, the configuration of the push-pull circuit is not limited to this.

In the above-described embodiment, the SIN wave PWM signal S sin_pwm output from the microcomputer 17 is caused to pass through the low-pass filter 30 to thereby generate the sinusoidal excitation signal Se. However, the aspect of the invention is not limited to this configuration. An excitation signal Se generated in another method may be input to the push-pull circuit 28.

In the above-described embodiment, by advancing the phase of the exciting current Ie from the reference phase by "45°", the values of an excitation noise superimposed on the output voltages of the current detection circuit 22 at respective timings, at which the output voltages of the current detection circuit 22 are acquired in one current detection process, are made equal to each other. However, the aspect of the invention is not limited to this. If the values of an excitation noise superimposed on the output voltages of the current detection circuit 22 at respective timings, at which the output voltages of the current detection circuit 22 are acquired in one current detection process, are equal to each other, the phase of the exciting current Ie may be offset from the reference phase in any way. Specifically, the phase of the exciting current Ie may be advanced from the reference phase by "225°" or may be retarded from the reference phase by "135°" or "315°".

What is claimed is:

1. A motor control device comprising:
    a current detection circuit that amplifies a voltage between terminals of a current detection resistor provided so as to correspond to each phase of a motor, and that outputs the amplified voltage;
    a current detector that detects a current value of each phase of the motor on the basis of an output voltage of the current detection circuit using a ground voltage as a reference;
    an exciting circuit that outputs an exciting current to a motor resolver provided to detect a rotation angle of the motor; and
    a motor driver that executes current control using a triangular wave as a PWM carrier on the basis of the current value of each phase and the rotation angle,
    wherein the current detector detects the current value of each phase on the basis of a difference between an output voltage of the current detection circuit, acquired at a timing at which the triangular wave reaches a peak, and an output voltage of the current detection circuit, acquired at a timing at which the triangular wave reaches a valley immediately before the triangular wave reaches the peak,
    wherein the current detection circuit and the exciting circuit share a grounding wire, and
    wherein the motor control device sets a phase of the exciting current in such a manner that output levels of the exciting current at respective timings, at which the current detector acquires an output voltage of the current detection circuit in one current detection circuit, are equal to each other.

2. The motor control device according to claim 1, wherein the current detection circuit and the exciting circuit are formed in one package that is separate from an electronic circuit that constitutes the current detector.

3. An electric power steering system comprising:
    the motor control device according to claim 2.

4. The motor control device according to claim 1, wherein one period of the exciting current is twice as long as one period of the triangular wave, and the phase of the exciting current is offset from a reference phase by 45° or 225°.

5. An electric power steering system comprising:
    the motor control device according to claim 4.

6. The motor control device according to claim 1, wherein the exciting circuit includes a push-pull circuit that is formed by connecting two transistors in such a manner that the two transistors are symmetrical in polarity.

7. An electric power steering system comprising:
    the motor control device according to claim 6.

8. An electric power steering system comprising;
    the motor control device according to claim 1.

* * * * *